Patented Feb. 4, 1930

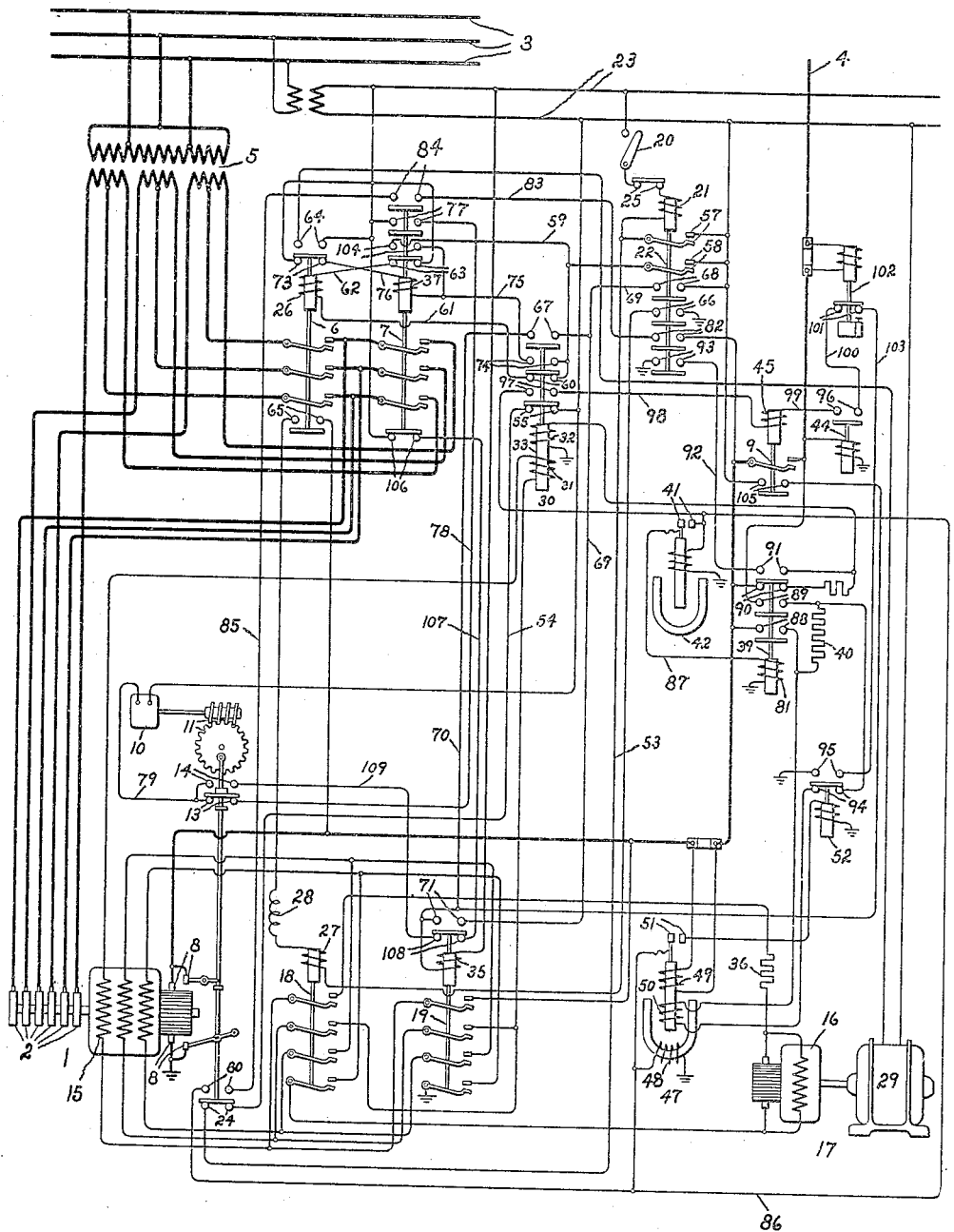

1,746,124

UNITED STATES PATENT OFFICE

GORDON R. McDONALD, OF SCHENECTADY, NEW YORK, ASSIGNOR TO GENERAL ELECTRIC COMPANY, A CORPORATION OF NEW YORK

AUTOMATIC CONTROL EQUIPMENT

Application filed March 2, 1929. Serial No. 344,047.

My invention relates to automatic control equipments for dynamo-electric machines and particularly to such equipments for rotary transformers, synchronous converters and the like.

An object of my invention is to provide a simple and improved control equipment of the above type in which a plurality of electromagnetically actuated devices are interconnected so that they operate automatically in the proper sequence to control the automatic starting and stopping of a rotary transformer.

My invention will be better understood from the following description taken in connection with the accompanying drawing, and its scope will be pointed out in the appended claims.

Referring to the drawing, which shows an automatic synchronous converter control equipment embodying my invention, 1 is a synchronous converter, the collector rings 2 of which are arranged to be connected to a suitable source of alternating current such as an alternating current supply circuit 3. The converter 1 is arranged to supply direct current to a direct current distribution circuit 4, one side of which is shown as ground. It is to be understood, however, that my invention is not limited to a grounded distribution system. A transformer 5 is interposed between the supply circuit 3 and the collector rings 2 of the converter 1 and is provided with suitable taps on its secondary winding so that a relatively low voltage may be impressed upon the collector rings 2 while the converter 1 is being started and normal operating voltage may be impressed upon the collector rings 2 after the converter 1 has been started. Any suitable switching means may be provided for controlling the connections between the transformer 5 and the collector rings 2. As shown in the drawing, a contactor 6 is provided for connecting the low voltage taps of the transformer 5 to the collector rings 2 and a contactor 7 is provided for connecting the high voltage taps of the transformer 5 to the collector rings 2.

The direct current brushes 8 of the converter 1 are arranged to be connected to the direct current distribution circuit 4 by a contactor 9 which connects the ungrounded brushes of the converter 1 to the ungrounded side of the distribution circuit 4. Any other suitable means, however, may be used for controlling the connection between the converter 1 and the distribution circuit 4.

The converter 1 is provided with suitable means for raising the direct current brushes 8 from the commutator so as to prevent sparking during the starting operation. In the particular arrangement diagrammatically shown in the drawing all but two of the brushes 8 are pivotally mounted so that they are raised and lowered by means of a motor 10 operating through a worm and worm gear 11, and a crank operated by the worm gear. The movable and stationary brushes 8 of corresponding polarity are electrically connected together. When the worm and worm gear 11 are in the position shown and movable brushes 8 are raised. When the worm gear has been rotated 180° from the position shown the movable brushes 8 are in engagement with the commutator of the converter 1. Suitable limit switches 13 and 14, are provided for automatically controlling the circuit of the motor 10 when the brush raising and lowering operations have been completed. As shown the switch 13 is closed when the brush raising operation is completed and remains closed until the brush lowering operation is completed. The switch 14 is closed when the lowering operation is completed and remains closed until the brush raising operation is completed.

The synchronous converter 1 is provided with a field winding 15 which is arranged to be connected to a suitable source of direct current having a fixed polarity such as a shunt generator 16 of motor generator set 17, by suitable switching means 18. The field winding 15 is also arranged to be connected across the direct current brushes 8 of the converter 1 by means of another suitable switching device 19. Preferably the field winding 15 is arranged to be divided into several sections when both of the switching means 18 and 19 are open so that when the converter is being started the voltage stresses in the field winding are reduced to a safe value.

In order to start and stop the synchronous converter 1 under normal conditions a hand switch 20 is provided which, when closed initiates the starting of the converter 1 and which, when opened, initiates the stopping of the converter 1. It is to be understood, however, that any other well known means, which may be either automatically or manually actuated, may be used to initiate the starting and stopping of the converter 1. As shown in the drawing, the closing of the switch 20 connects the coil 21 of a control relay 22 across a suitable control circuit 23 which may be supplied from a suitable source of current such as the supply circuit 3.

Since it is desirable to start the converter only when the movable brushes 8 are out of engagement with the commutator of the converter, the energizing circuit of the coil 21 of the relay 22 also includes contacts 24 on the brush operating mechanism, which are closed only when the movable brushes 8 are out of engagement with the commutator. The circuit of coil 21 also includes contacts of the protective devices, which are usually provided with automatic control equipments, so that the relay 22 can operate to effect the starting of the synchronous converter only when these protective devices indicate that the apparatus is in an operative condition. In order to simplify the disclosure these protective devices have been omitted since they do not constitute a part of my present invention. Contacts 25, however, are shown to indicate where the contacts of these protective devices may be connected in the circuit of the coil 21.

When the relay 22 is energized by the closing of the control switch 20 it effects the completion of a circuit for the coil 26 of the starting contactor 6 so that the collector rings 2 are connected to the low voltage taps of the transformer 5 to start the converter 1.

In order that the converter 1 may be pulled into synchronism with the correct polarity in case it builds up in the wrong direction while the converter is accelerating, the switching means 18 is arranged to connect the field winding 15 of the converter to the source of excitation 16 when the converter reaches substantially synchronous speed. This result is accomplished by connecting the closing coil 27 of the switching means 18 across the direct current brushes 8 of the converter 1 with a suitable reactor 28 in series therewith so that during the starting operation sufficient current does not flow through the coil 27 to close the switch 18 until the converter reaches substantially synchronous speed and very low frequency current flows through the circuit of the coil 27. In order that the voltage of the generator 16 may have time to build up to its normal value before switch 18 closes, the starting switch 6 is arranged to complete a circuit for the motor 29 of the motor generator set 17 to start the set at the same time that the converter 1 is connected to the low voltage taps on the transformer.

In order to change from separate to self excitation of the converter and from the starting to the running connections of the transformer 5 after the converter 1 has reached synchronous speed with the correct polarity, I provide in accordance with my invention a relay 30 which has two cooperating windings 31 and 32 which are wound around the same core 33. The winding 31 is connected in the field circuit of the converter 1 so that the winding 31 is energized in accordance with the direct current flowing through the field winding 15 and the winding 32 is connected across the direct current brushes 8 of the converter 1 during the starting operation so that it is energized in accordance with the direct current voltage of the converter 1. The relay 30 is designed in any suitable manner so that neither normal field current through the converter field winding 15 nor normal direct current voltage across the winding 32 alone can pick up the relay 30 but it requires that both of these windings be simultaneously energized in order to pick it up. After the relay 30 has been picked up, however, either normal field current through the winding 31 or normal voltage impressed across the winding 32 is sufficient to maintain the relay 30 in its picked up position.

When the relay 30 picks up it effects the energization of the coil 35 of the contactor 19 so that the field winding 15 is connected across the direct current brushes 8 of the converter 1. The picking up of the relay 30 also effects the deenergization of the coil 26 of the starting contactor 6 so that the converter 1 is disconnected from the low voltage taps of the transformer 5. When the starting contactor 6 opens it disconnects the coil 27 of the contactor 18 from across the direct current brushes of the converter so that the auxiliary source of excitation 16 is disconnected from the converter field winding 15. The contactor 18, however, does not open until after the contactor 19 has closed so that there is no interruption in the supply of exciting current to the field winding 15. In order that an excessive circulating current may not flow between the exciter 16 and the converter 1 while they are connected together, I provide in series with the exciter 16 a suitable current limiting device such as a resistor 36.

As soon as the starting contactor 6 opens, an energizing circuit is completed for the closing coil 37 of the running contactor 7 so that the converter 1 is connected to the high voltage taps of the transformer 35.

As soon as the running contactor 7 closes a circuit is completed for the operating motor 10 of the brush operating mechanism to lower the movable brushes 8 into engagement with the converter commutator. After the brushes have been lowered a circuit is completed for a contactor 39 to connect a load indicating resistor 40 in series between the ungrounded brushes 8 of the converter 1 and the ungrounded side of the direct current load circuit 4. The circuit of the contactor 39 also includes contacts 41 of a polarized relay 42 which is responsive to the polarity of the converter 1 so that the converter can be connected to the load circuit 4 only when it has a predetermined polarity. The contactor 39 in addition to connecting the resistor 40 between the converter 1 and the load circuit 4 also disconnects the winding 32 of the relay 30 from across the direct current brushes 8 of the converter 1 and completes a shunt circuit around the winding 32 so that it acts as a short-circuited winding around the core 33. Therefore, while the converter is in operation any momentary decreases in exciting current, which may occur due to sudden changes in the load, do not cause the relay 30 to move to its deenergized position.

Any suitable automatic reclosing arrangement may be employed to control the closing of the contactor 9 between the converter 8 and the load circuit 4. In the particular arrangement shown in the drawing I have provided a voltage relay 44 which is responsive to the voltage across the load circuit 4. If the load resistance is above a predetermined value after the contactor 39 closes, the relay 44 picks up and completes an energizing circuit for the closing coil 45 of the contactor.

In some cases where the load circuit 4 may be supplied from one of the sources it is desirable not to have the contactor 9 close when the load circuit voltage is above the direct current voltage of the converter 1. In the particular arrangement shown in the drawing, I accomplish this result by means of a voltage directional relay 47 having a voltage winding 48 which is arranged to be connected across the direct current brushes of the converter after the brushes have been lowered, and two current responsive windings 49 and 50 which are respectively connected so that they are energized in response to the current output of the converter 1 and the voltage across the load indicating resistor 40. When the converter voltage is above the load circuit voltage after the contactor 39 closes, the current through the windings 49 and 50 is in the proper direction to cause the relay 47 to close its contacts 51 and complete a circuit for a control relay 52 which, in turn, closes contacts in the energizing circuit of the closing coil 45 of the contactor 9. It will be observed that after the contactor 9 closes the relay 47 operates as a reverse power relay to effect the opening of the contactor 9 in case current flows from the load circuit 4 to the converter 1.

The operation of the arrangement shown in the drawing is as follows: When the converter 1 is shut down and all of the apparatus is in an operative condition the various control devices occupy the positions shown in the drawing. When the control switch 20 is closed to effect the starting of the converter 1 a circuit is completed for the closing coil 21 of master relay 22. This circuit is from one side of the control circuit 23 through control switch 20, contacts 25 of the protective devices, coil 21 of master relay 22, conductor 53, contacts 24 on the brush operating mechanism, conductor 54, contacts 55 of relay 30 to the other side of the control circuit 23. Since, under the conditions assumed, the relay 30 is deenergized and the movable brushes 8 are raised, the control relay 22 is energized. By closing its contacts 57, relay 22 completes a locking circuit for itself which is independent of the contacts 24 of the brush operating mechanism and the contacts 55 of the relay 30 so that the relay 22 remains energized when these contacts are subsequently open during the starting operation. Relay 22 by closing its contacts 58 completes a circuit for the closing coil 26 of the starting contactor 6 so that the collector rings 2 of the converter are connected to the low voltage terminals of the transformer 5. The circuit of coil 26 is from one side of the control circuit 23 through the contacts 58 of the relay 22, conductor 59, contacts 60 of relay 30, conductor 61, coil 26 of contactor 6, conductor 62, contacts 63 of contactor 7 to the other side of the control circuit. As soon as contactor 6 closes the converter starts to rotate. The contactor 6 by closing its contacts 64 connects the motor 29 of the motor generator set 17 across the control circuit 23 so that the generator 16 is in condition to supply direct current to the field winding 15 when the switch 18 is subsequently closed.

Relay 6 by closing its contacts 65 connects the coil 27 of the switch 18, the reactor 28, and the contacts 66 of master relay 22 in series across the direct current brushes 8 of the converter 1. As long as the converter 1 is rotating at a speed below synchronous speed the current flowing through the circuit of the coil 27 of the switch 18 is an alternating current. The inductance of the reactor 28, however, is of such a value that sufficient alternating current cannot flow through the circuit of the coil 27 to cause the switch 18 to close until the converter 1 reaches substantially synchronous speed. When, however, the converter 1 reaches synchronous speed sufficient current flows through the circuit of the coil 27 to close the switch 18 thereby connecting the field winding 15, the coil 31 of relay 30 and resistor 36 in series across the generator 16 to pull the converter 1 into synchronism with the right polarity. As soon as the direct current through the field winding 15 builds up to a predetermined value, the converter 1 pulls into synchronism with right polarity, and the direct current voltage is above a predetermined value, the relay 30 picks up. By closing its contacts 67, the relay 30 completes a circuit for the closing coil 35 of the switch 19. The circuit of the closing coil 35 is from one side of the control circuit 23 through contacts 68 of master relay 22, conductor 69, contacts 67 of relay 30, conductor 70, closing coil 35 of contactor 19 to the other side of the control circuit 23. Contactor 19 by closing its main contacts connects the field winding 15 of the converter across the direct current brushes 8 of the converter 1 with the coil 31 of relay 30 in series therewith. Contactor 19 by closing its auxiliary contacts 71 completes a shunt circuit around contacts 67 of relay 30 so that the contactor 19 completes a holding circuit for its closing coil 35.

The relay 30 by opening its contacts 60 opens the heretofore described circuit for the closing coil 26 of contactor 6 so that the contactor 6 opens and disconnects the converter 1 from the low voltage taps on the transformer 5. The contactor 6 by opening its contacts 64 effects the shutting down of the motor generator set 17 since the converter is now self-excited and, therefore, there is no further need of the motor generator set.

The contactor 6 by opening its contacts 65 opens the heretofore described circuit for the closing coil 27 of the contactor 18 so that the converter field winding 15 is disconnected from the exciter 16. The contactor 18, however, does not open until after the contactor 19 has closed so that for a short interval the exciter 16 is connected across the direct current brushes of the converter. Consequently, the supply of exciting current to the field winding 15 is not interrupted when the transfer is made from separate excitation to shunt excitation. The resistor 36 prevents an excessive flow of current between the exciter and the converter in case the voltage difference between the two machines is great.

As soon as the starting switch 6 closes its auxiliary contacts 73, an energizing circuit is completed for the closing coil 37 of the running contactor 7 so that the converter is connected to the high voltage taps on the transformer 5. This energizing circuit is from one side of the control circuit 23 through contacts 58 of master relay 22, conductor 59, contacts 74 of relay 30, conductor 75, closing coil 37 of contactor 7, conductor 76, auxiliary contacts 73 on starting contactor 6 to the other side of the control circuit 23. Contactor 7 by closing its contacts 104 completes a locking circuit for itself which is independent of the contacts 74 of the relay 30.

The contactor 7 by closing its auxiliary contacts 77 completes a circuit for the operating motor 10 of the brush operating mechanism to lower the movable brushes 8 into engagement with the converter commutator. This circuit is from one side of the control circuit 23 through auxiliary contacts 77 on contactor 7, conductor 78, contacts 13 on the brush operating mechanism conductor 79, operating motor 10 to the other side of the control circuit. As soon as the brushes 8 have been lowered, the lowering circuit is interrupted by the opening of the contacts 13 on the brush operating mechanism. When the brushes have been lowered the brush operating mechanism also opens its contacts 13 and 24 and closes its contacts 14 and 80. A circuit is then completed for the coil 81 of the contactor 39. This circuit is from the ungrounded brushes 8 of the converter 1 through contacts 82 of master relay 22, conductor 83, auxiliary contacts 84 on running contactor 7, conductor 85, contacts 80 of the brush operating mechanism, conductor 86, contacts 41 of the polarized relay 42 which are closed if the converter has a predetermined polarity, conductor 87, closing coil 81 of contactor 39 to ground. Contactor 39 by closing its contacts 88 and 89 connects the load indicating resistor 40 in series between the ungrounded brushes 89 of the converter 1 and the ungrounded side of the load circuit 4. Contactor 39 by opening its contacts 90 disconnects the voltage coil 32 of the relay 30 from across the direct current brush 8 of the converter 1 and by closing its contacts 91 completes through conductor 92 and contacts 93 of master relay 22 a shunt circuit around the winding 32 so that this winding is a short-circuited winding around the core 33 and, therefore, prevents the relay 30 from responding to momentary fluctuations in the direct current flowing through the converter field winding. It will be observed that during normal operation only the winding 31 of the relay 30 is energized so that if the converter field circuit is interrupted for any reason whatever and remains interrupted the relay 30 moves to its deenergized position.

After the contactor 39 closes, the voltage directional relay 47 closes its contacts 51 when the converter direct current voltage is above the load circuit voltage. The closing of the contacts 51 connects the coil of the relay 52 between conductor 86 and ground so that this relay is energized and opens its contacts 94 and closes its contacts 95. The opening of contacts 94 disconnects the coil 50 of the relay 47 from in shunt to the resistor 40.

As soon as the conditions on the load circuit are such as to cause the reclosing relay 44 to close its contacts 96 after the contactor 39 has been closed and the relay 52 has been energized, an energizing circuit is completed for the closing coil 45 of the contactor 9 to close the contactor 9 and connect the converter 1 directly to the load circuit 4. This energizing circuit is from the ungrounded brushes 8 of the converter 1 through contacts 82 of master relay 22, conductor 83, auxiliary contacts 84 on running contactor 7, conductor 85, contacts 80 on the brush operating mechanism, conductor 86, contacts 97 of relay 30, conductor 98, closing coil 45 of contactor 9, conductor 99, contacts 96 of reclosing relay 44, conductor 100, contacts 101 of an overcurrent relay 102 which is responsive to the current supplied to the load circuit 4 when the contactor 9 is closed, conductor 103, contacts 95 of relay 52 to ground. Contactor 9 by closing its auxiliary contacts 105 completes a locking circuit for the closing coil 35 of the contactor 19 so that the shunt field circuit of the converter 1 cannot be opened while the contactor 9 is closed.

When it is desired to shut down the converter 1 the control switch 20 is opened which interrupts the circuit of the coil 21 of the master relay 22. Master relay 22 by opening its contacts 58 opens the heretofore described circuit for the running contactor 7 so that the converter 1 is disconnected from the high voltage taps of the transformer 5. Master relay 22 by opening its contacts 82 interrupts the heretofore described circuits for the closing coils 45 and 81 of the contactors 9 and 39 respectively so that the converter 1 is also disconnected from the load circuit 4. As soon as the contactor 9 opens its auxiliary contacts 105, the heretofore described locking circuit for the closing coil 35 of the contactor 19 is interrupted so that the field winding 15 is disconnected from across the direct current brushes of the converter. When the contactor 19 opens, a circuit is completed for the operating motor 10 to raise the brushes. This circuit is from one side of the control circuit 23 through auxiliary contacts 106 on contactor 7, conductor 107, contacts 108 on contactor 19, conductor 109, contacts 14 on the brush operating mechanism, conductor 79, brush operating motor 10 to the other side of the control circuit. As soon as the brushes have been raised, the raising circuit for the motor 10 is interrupted by the opening of the contacts 14 on the brush operating mechanism.

When the closing coil 81 of the contactor 39 is deenergized during the shutting down operation, the contactor 39 by closing its contacts 90 reconnects the voltage coil 32 of the relay 30 across the direct current brushes 8 of the converter 1. This winding, therefore, maintains the relay 30 in its picked up position until the voltage across the direct current brushes of the converter 1, due to the residual magnetism of the converter field has decreased below a predetermined value. In this manner the restarting of the converter is prevented until all of the apparatus is in the proper condition to operate in the proper sequence when a restart is desired.

While I have, in accordance with the patent statutes, shown and described my invention as applied to a particular system and as embodying various devices diamgrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a source of alternating current, a synchronous converter, means for connecting said converter to said source so that a relatively low voltage is impressed upon said converter, means for connecting said converter to said source so that a relatively high voltage is impressed upon said converter, a source of excitation, means for connecting said source of excitation to the field winding of said converter, means for connecting the field winding across the direct current brushes of the converter, and means controlled by the current supplied by said source of excitation to the converter field winding for controlling said connecting means so that when direct current is supplied by said source of excitation to the converter field winding the closing of the connecting means between the converter brushes and the field winding and the opening of the relatively low voltage connecting means are effected and the closing of the relatively high voltage connecting means and the opening of the connecting means between the source of excitation and the field winding are subsequently affected.

2. In combination, a source of alternating current, a synchronous converter, switching means for connecting said converter to said source so that a relatively low voltage is impressed on said converter including a control circuit which when deenergized effects the opening of said switching means, switching means for connecting said converter to said source so that a relatively high voltage is impressed on said converter including an electromagnet device which when energized effects the closing of said switch, a source of excitation, electroresponsive means arranged when energized to connect said source to the field winding of said converter, other electroresponsive means arranged when energized to effect the connection of the field winding of said converter across the direct current brushes of said converter, a relay having a winding connected in series with the converter field winding and a cooperating winding connected across the converter direct current brushes for effecting the deenergization of said control circuit and the energization of said other electroresponsive means, and means responsive to the disconnection of the relatively low voltage from said converter for effecting the energization of said electromagnetic device to effect the connection of the relatively high voltage to said converter and the deenergization of said first mentioned electroresponsive means to effect the disconnection of the converter field winding from said source of excitation.

3. In combination, a synchronous converter, means for effecting the automatic starting of said converter including a relay having two cooperating windings respectively energized in response to the direct current voltage and the current in a field winding of the converter, and means responsive to the completion of the starting operation of the converter for short-circuiting the voltage winding of said relay.

4. In combination, an alternating current circuit, a direct current circuit, a rotary transformer, means for effecting the connection of said transformer to said alternating current circuit to start said transformer and to effect the subsequent connection thereof to said direct current circuit including a relay having a winding responsive to the excitation of said transformer and another winding responsive to the direct current voltage of said transformer, and means responsive to a predetermined electrical condition of said transformer during the starting operation thereof for short-circuiting the relay winding which is responsive to the transformer voltage.

5. In combination, an alternating current circuit, a direct current circuit, a rotary transformer, means for effecting the connection of said transformer to said alternating current circuit to start said transformer and for controlling the excitation of said transformer to cause the direct current voltage of said transformer to have a predetermined polarity including a relay having a winding responsive to the excitation of the transformer and a cooperating voltage winding connected across the direct current brushes of said transformer, means for connecting said transformer to said direct current circuit, and means controlled by said last mentioned connecting means for disconnecting said voltage winding of said relay from across the transformer direct current brushes and for completing a shunt circuit around said voltage winding.

6. In combination, a source of alternating current, a direct current circuit, a rotary transformer, automatic switching means for controlling the connection of said transformer to said source and said circuit and for controlling the excitation of said transformer, said means including a control relay which is arranged to be energized at a predetermined point in the sequence of operation of said switching means to effect further operation of said switching means, a master relay arranged when energized to effect the operation of said switching means to connect said transformer to said source and to control the excitation of said transformer and when deenergized to effect the disconnection of said transformer from said source, a voltage winding for said control relay, means responsive to the deenergization of said master relay for connecting said voltage winding across the direct current brushes of the transformer, and means controlled by said control relay for controlling said master relay so that it can be reenergized only after the voltage across said voltage winding has decreased below a predetermined value.

7. In combination, a source of alternating current, a direct current circuit, a rotary transformer, automatic switching means for controlling the connection of said transformer to said source and circuit and for controlling the excitation of said transformer, said means including a control relay having a winding responsive to the excitation of said transformer and a voltage winding connected across the direct current brushes of said transformer, means responsive to a predetermined condition of said transformer for effecting the disconnection of said voltage winding from across the transformer brushes, a master relay arranged when energized to effect the operation of said switching means to connect said transformer to said source and circuit and to control the excitation of said transformer and when deenergized to effect the disconnection of said transformer from said source, means responsive to the deenergization of said master relay for reconnecting said voltage winding across the direct current brushes of said transformer, an energizing circuit for said master relay, and contacts in said energizing circuit controlled by said control relay so that said master relay can be reenergized only after the direct current voltage of said transformer has decreased below a predetermined value.

8. In combination, an alternating current circuit, a direct current circuit, a rotary transformer, automatic switching means for controlling the connection between said alternating current circuit and said transformer to effect the starting thereof and the excitation of said transformer so that it has a predetermined polarity and the connection of said transformer to said direct current circuit including a relay having a winding responsive to the excitation of said transformer and a voltage winding connected across the direct current terminals of said transformer, a master relay arranged when energized to effect the operation of said automatic switching means to start said transformer and the connection thereof to the direct current and when deenergized to effect the operation of said automatic switching means to disconnect said transformer from both of said circuits, means responsive to the connection of said transformer to said direct current circuit for disconnecting said voltage winding from across the transformer direct current brushes, means responsive to the deenergization of said master relay for reconnecting said voltage winding across the direct current brushes of said transformer, an energizing circuit for said master relay, and contacts in said energizing circuit controlled by said relay so that said energizing circuit cannot be completed as long as the voltage across the direct current brushes of said transformer is above a predetermined value.

9. In combination, an alternating current circuit, a direct current circuit, a rotary transformer, means for effecting the connection of said transformer to said alternating current circuit to start said transformer and to effect the subsequent connection thereof to said direct current circuit including a relay having a winding connected in the exciting circuit of the transformer so that it is energized in accordance with the current through the transformer field circuit during the starting and normal operation of the transformer and a voltage winding responsive to the direct current voltage of the transformer, and means responsive to a predetermined electrical condition of said transformer during the starting operation thereof for rendering said voltage winding unresponsive to the transformer direct current voltage during the subsequent normal operation of the transformer.

10. In combination, an alternating current circuit, a direct current circuit, a rotary transformer, means for effecting the connection of said transformer to said alternating current circuit to start said transformer and to effect the subsequent connection thereof to said direct current circuit including a relay having a winding connected in the exciting circuit of the transformer so that it is energized in accordance with the current through the transformer field circuit during the starting and normal operation of the transformer and a voltage winding responsive to the direct current voltage of the transformer, and means responsive to the connection of said transformer to the direct current circuit for rendering said voltage winding unresponsive to the transformer direct current voltage.

11. In combination, an alternating current circuit, a direct current circuit, a rotary transformer, means for effecting the connection of said transformer to said alternating current circuit to start said transformer and to effect the subsequent connection thereof to said direct current circuit including a relay having a winding connected in the exciting circuit of the transformer so that it is energized in accordance with the current through the transformer field circuit during the starting and normal operation of the transformer and a voltage winding connected across the direct current brushes of the transformer and means responsive to a predetermined electrical condition of said transformer during the starting operation thereof for disconnecting said voltage winding from the transformer direct current brushes.

12. In combination, an alternating current circuit, a direct current circuit, a rotary transformer, and means for effecting the automatic starting and interconnection of said transformer between said circuits and the automatic disconnection and stopping of said transformer including a relay having a winding energized at all times in accordance with the excitation of said transformer, a cooperating winding, and means for energizing said cooperating winding in response to the direct current voltage of said transformer during the starting and stopping operations thereof and for rendering said cooperating winding unresponsive to the direct current voltage of the transformer during the normal operation thereof.

13. In combination, an alternating current circuit, a direct current circuit, a rotary transformer, and means for effecting the automatic starting and interconnection of said transformer between said circuits and the automatic disconnection of said transformer between said circuits and the automatic disconnection and stopping of said transformer including a relay having a winding energized at all times in accordance with the excitation of said transformer, a cooperating winding, and means for energizing said cooperating winding in response to the direct current voltage of said transformer during the starting and stopping operations thereof and for short circuiting said cooperating winding during the normal operation of said transformer.

In witness whereof, I have hereunto set my hand this 16th day of February, 1929.

GORDON R. McDONALD.